(12) United States Patent
Zhang et al.

(10) Patent No.: US 11,658,791 B2
(45) Date of Patent: May 23, 2023

(54) METHOD FOR PROCESSING INFORMATION AND TERMINAL DEVICE

(71) Applicant: Samsung Electronics Co., Ltd., Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 17/256,619

(22) PCT Filed: Jun. 25, 2019

(86) PCT No.: PCT/KR2019/007634
§ 371 (c)(1),
(2) Date: Dec. 28, 2020

(87) PCT Pub. No.: WO2020/004894
PCT Pub. Date: Jan. 2, 2020

(65) Prior Publication Data
US 2021/0266133 A1 Aug. 26, 2021

(30) Foreign Application Priority Data

Jun. 29, 2018 (CN) .......................... 201810695916.1

(51) Int. Cl.
*H04L 5/00* (2006.01)
*H04W 4/46* (2018.01)
(Continued)

(52) U.S. Cl.
CPC .......... *H04L 5/0094* (2013.01); *H04L 1/1861* (2013.01); *H04L 5/0055* (2013.01);
(Continued)

(58) Field of Classification Search
CPC ... H04L 5/0094; H04L 1/1861; H04L 5/0055; H04W 4/46; H04W 4/44; H04W 72/042
See application file for complete search history.

(56) References Cited

U.S. PATENT DOCUMENTS 10,992,423 B2 * 4/2021 Parkvall ................ H04L 1/1854
2010/0261469 A1 10/2010 Ribeiro et al.
(Continued)

FOREIGN PATENT DOCUMENTS

WO 2016/182405 A1 11/2016
WO WO-2019197025 A1 * 10/2019 ........... H04B 7/0456

OTHER PUBLICATIONS

European Patent Office, "Supplementary European Search Report" dated Feb. 11, 2022, in connection with European Patent Application No. 19826615.7, 8 pages.
(Continued)

*Primary Examiner* — Michael J Moore, Jr.

(57) ABSTRACT

The present application relates to the field of communication technologies, and relates to a method for processing information and a terminal device, the method for processing information includes: determining a corresponding feedback resource based on received indication information; receiving sidelink data transmitted by a second UE; and, transmitting feedback information of the sidelink data on the sidelink data. In the present application, the problem of implementing feedback of HARQ-ACK information and channel state information in the sidelink communication is addressed, and the mode of transmitting the sidelink data is further optimized, thereby improving spectral efficiency on the sidelink channel.

11 Claims, 7 Drawing Sheets

(51) Int. Cl.
    *H04W 4/44*         (2018.01)
    *H04L 1/1829*     (2023.01)
    *H04W 72/04*      (2023.01)

(52) U.S. Cl.
    CPC ............... *H04W 4/44* (2018.02); *H04W 4/46* (2018.02); *H04W 72/042* (2013.01)

(56) References Cited

U.S. PATENT DOCUMENTS

| | | | |
|---|---|---|---|
| 2015/0327220 A1 | 11/2015 | Pan et al. | |
| 2017/0215183 A1* | 7/2017 | Gulati | H04L 1/1887 |
| 2018/0091265 A1 | 3/2018 | Liu et al. | |
| 2019/0052436 A1* | 2/2019 | Desai | H04L 5/0055 |
| 2020/0127768 A1* | 4/2020 | Seo | H04B 7/0626 |
| 2020/0228257 A1* | 7/2020 | Baldemair | H04L 5/0092 |
| 2020/0236666 A1* | 7/2020 | Yu | H04W 72/0446 |
| 2020/0305176 A1* | 9/2020 | Hu | H04L 1/1819 |
| 2021/0029687 A1* | 1/2021 | Hong | H04L 5/0053 |
| 2021/0050950 A1* | 2/2021 | Zhou | H04W 72/042 |
| 2021/0075556 A1* | 3/2021 | Karaki | H04B 7/0456 |
| 2021/0266133 A1* | 8/2021 | Zhang | H04L 1/1861 |

OTHER PUBLICATIONS

Notification of Transmittal of the International Search Report and the Written Opinion of the International Searching Authority, or the Declaration dated Oct. 18, 2019 in connection with International Patent Application No. PCT/KR2019/007634, 13 pages.

\* cited by examiner

[Fig. 1]
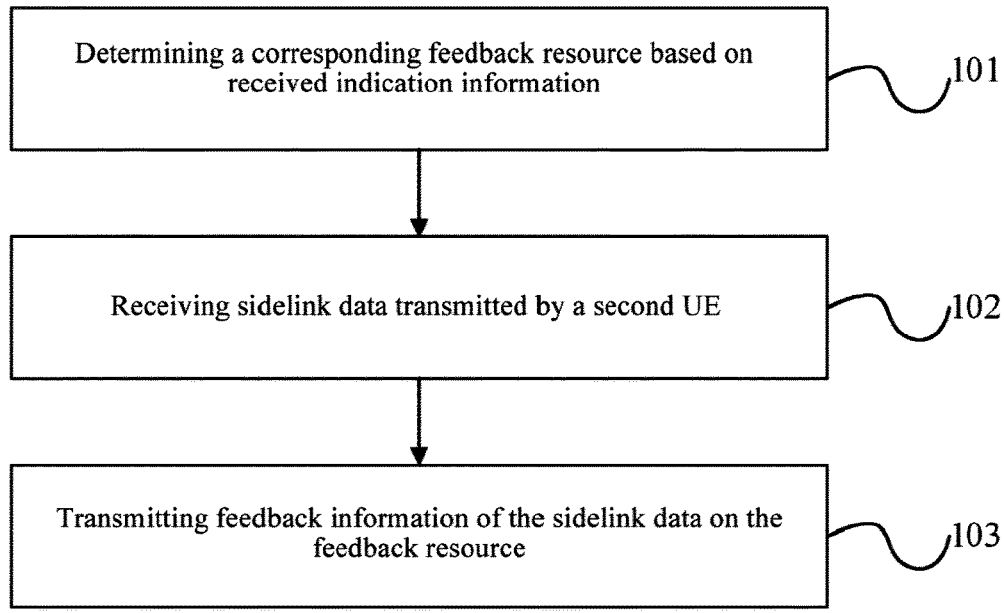
[Fig. 2]
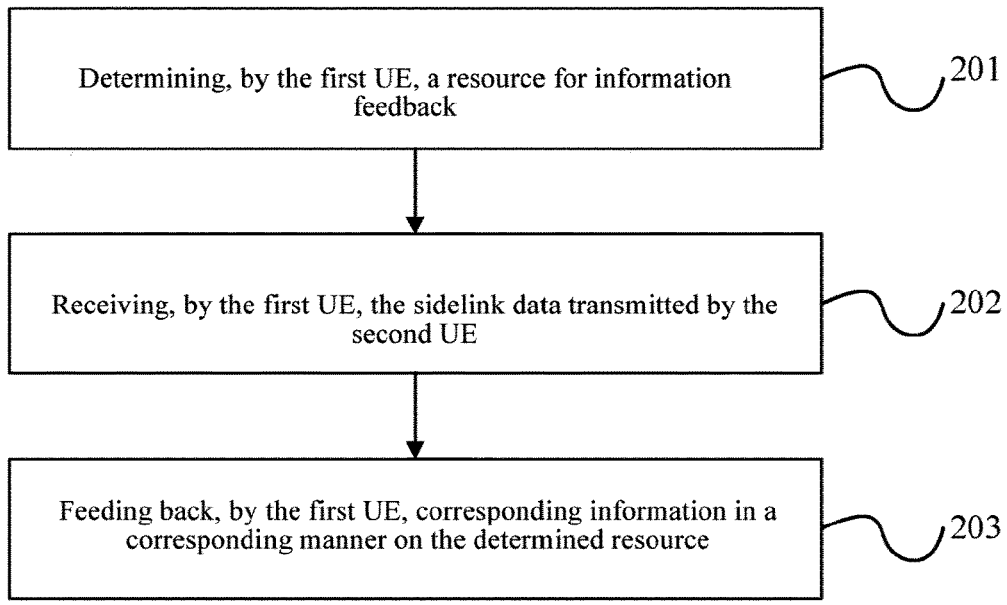
[Fig. 3]
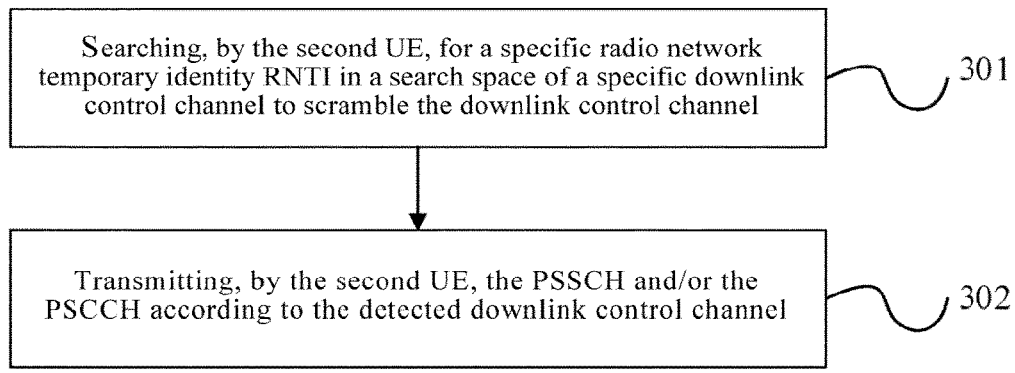

[Fig. 4]
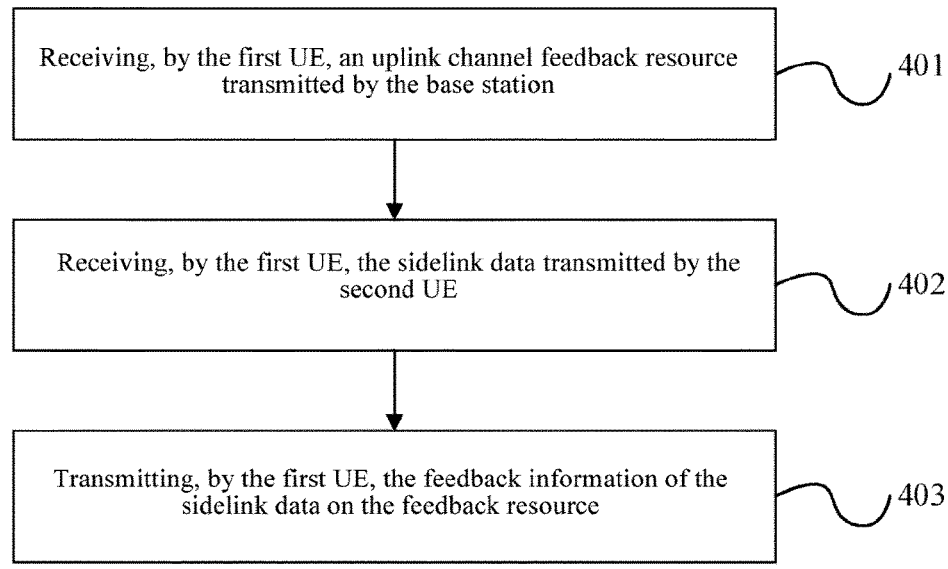
[Fig. 5]
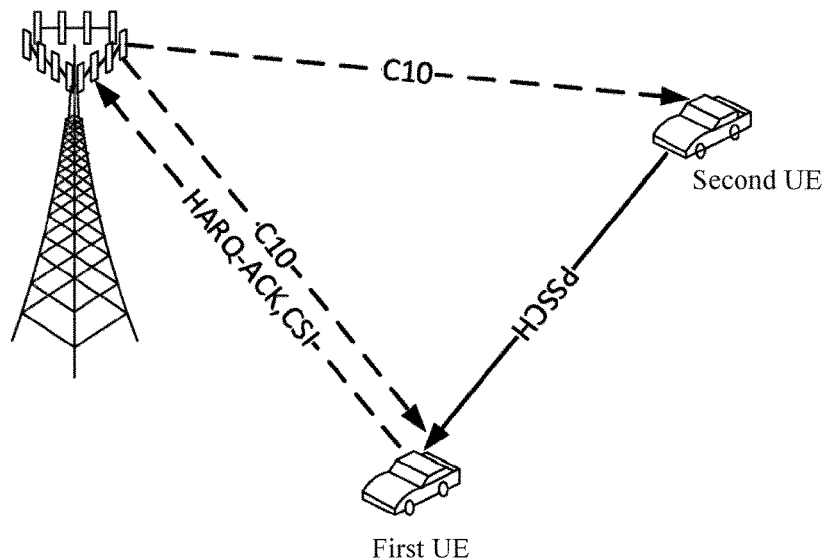
[Fig. 6]
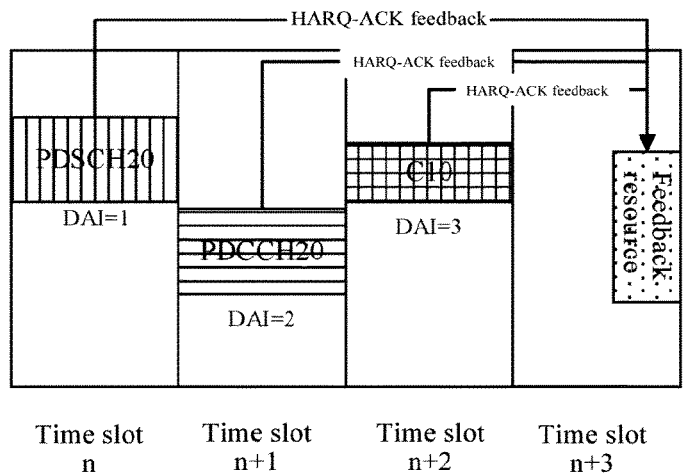

[Fig. 7]
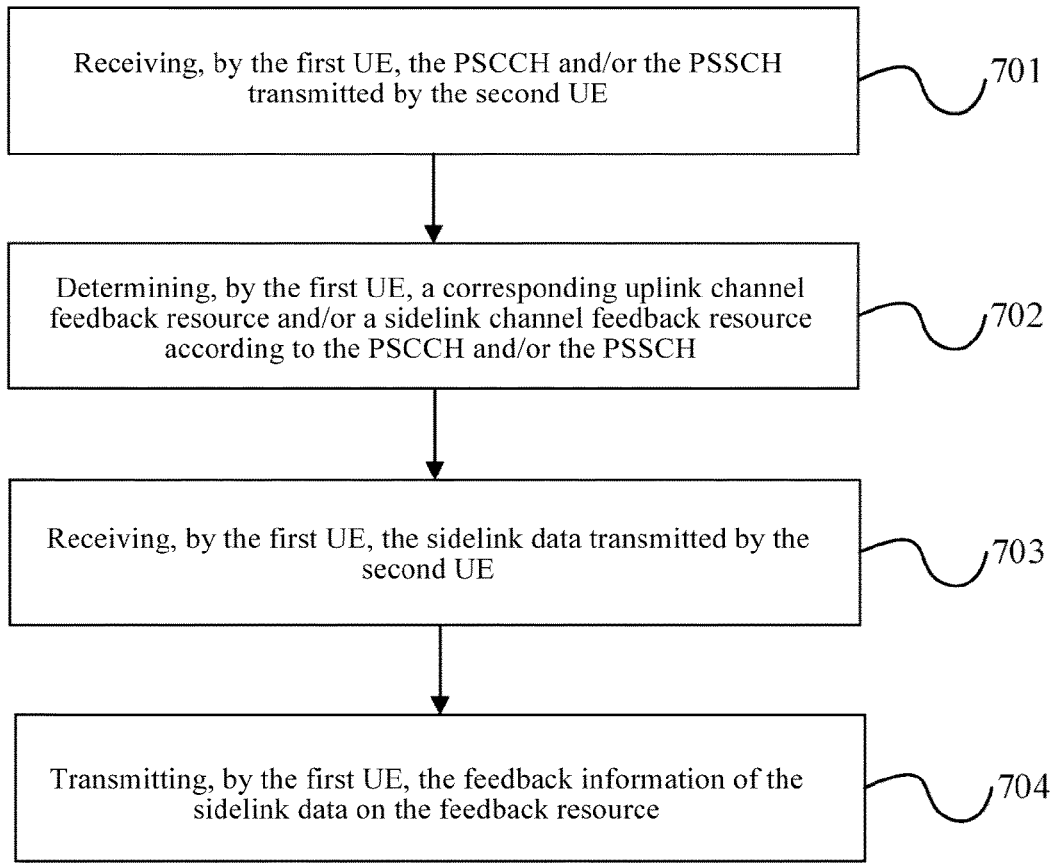
[Fig. 8]
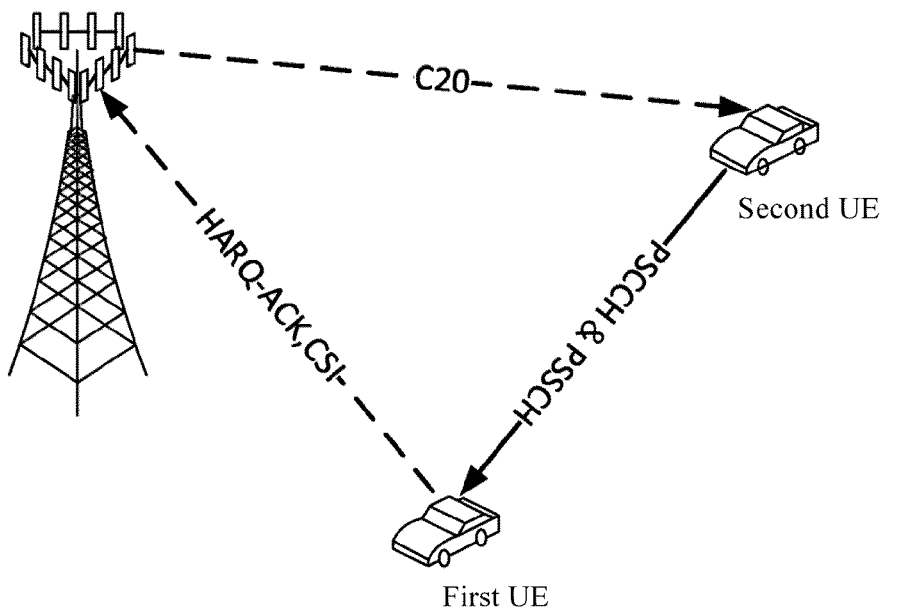

[Fig. 9]
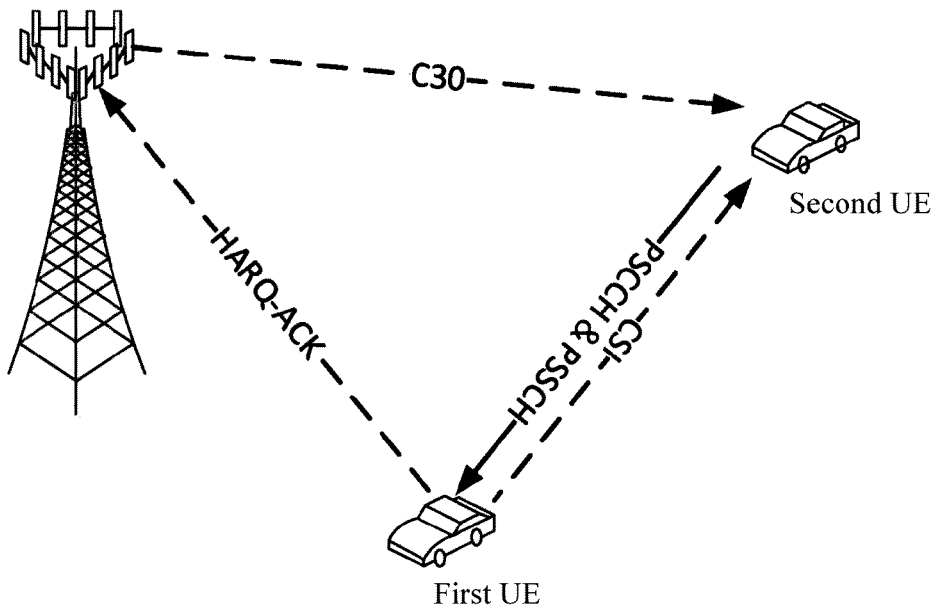
[Fig. 10]
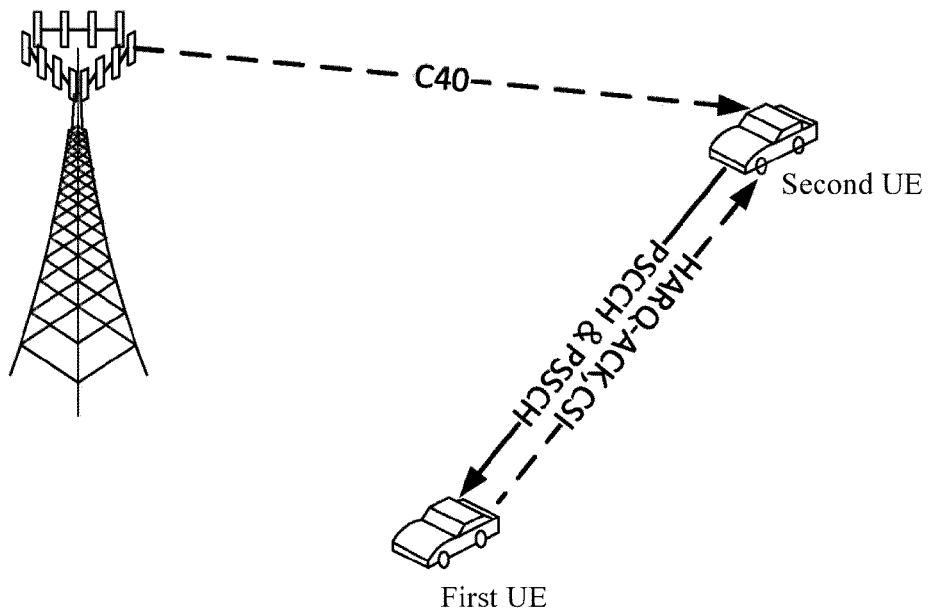

[Fig. 11]
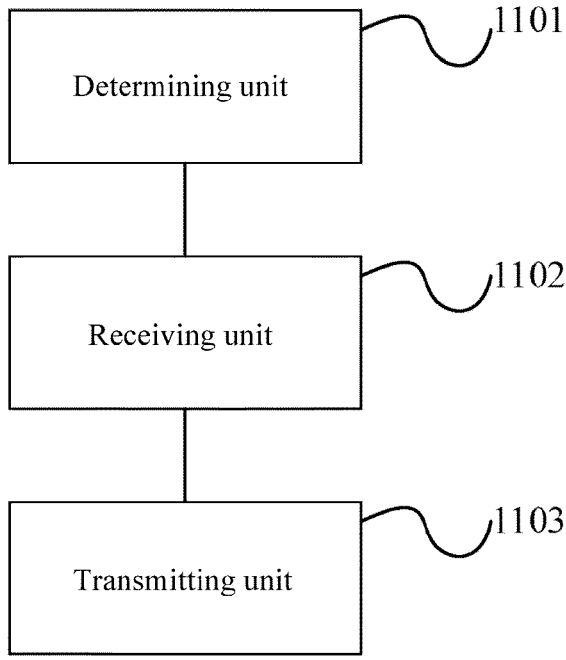
[Fig. 12]
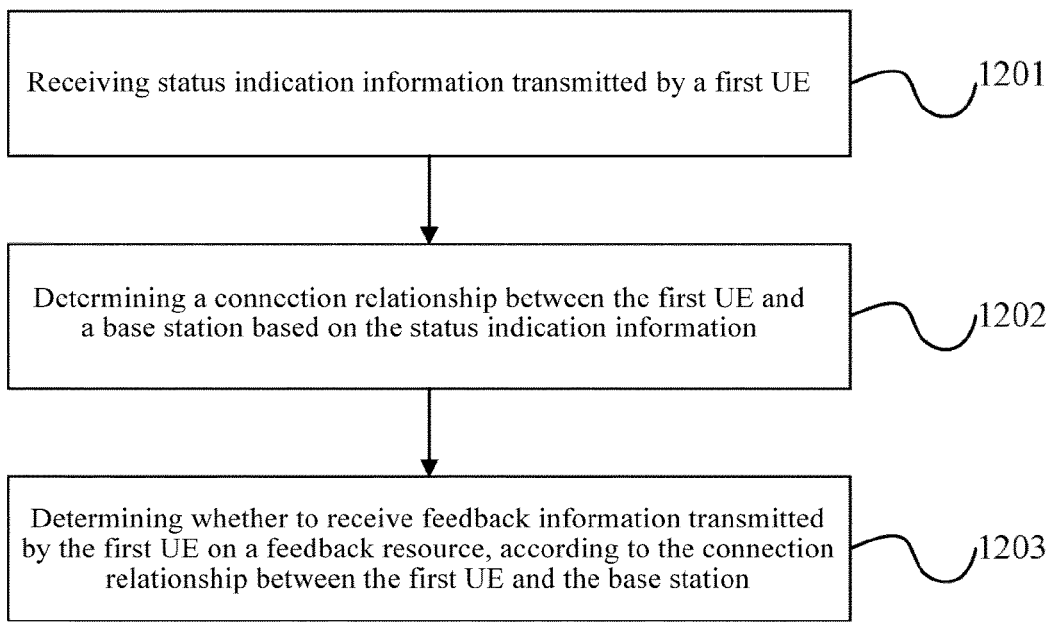

[Fig. 13]
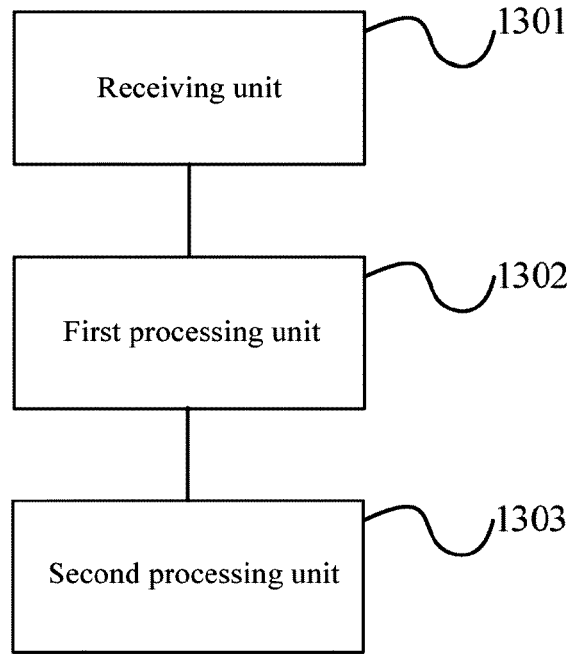
[Fig. 14]
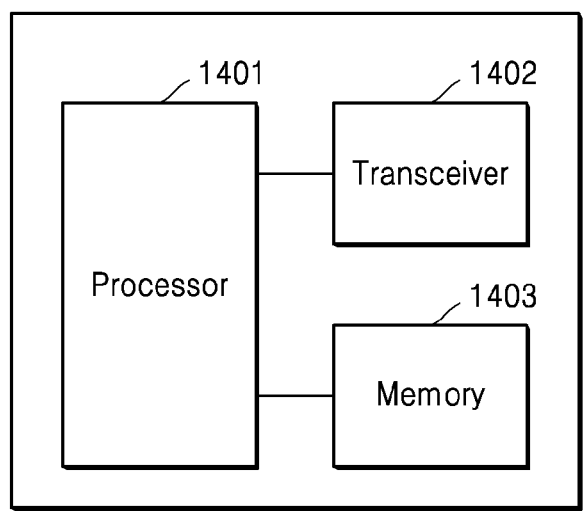

[Fig. 15]
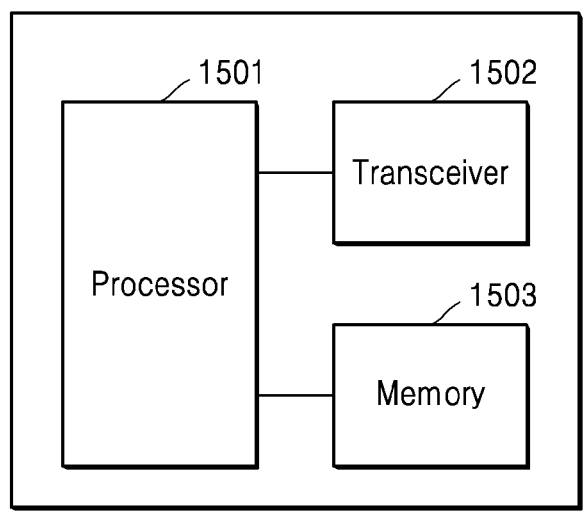
[Fig. 16]
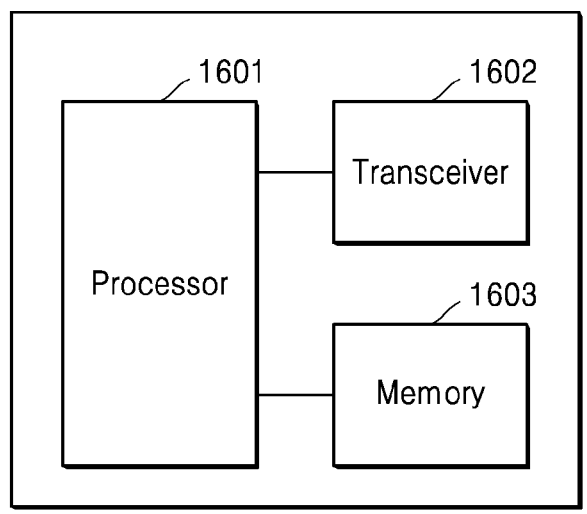

METHOD FOR PROCESSING INFORMATION AND TERMINAL DEVICE

CROSS-REFERENCE TO RELATED APPLICATIONS

This application is a 371 of International Application No. PCT/KR2019/007634 filed on Jun. 25, 2019, which claims priority to Chinese Patent Application No. 201810695916.1 filed on Jun. 29, 2018, the disclosures of which are herein incorporated by reference in their entirety.

BACKGROUND

1. Field

The present application relates to the field of mobile communication technologies, and in particular to a method for processing information and a terminal device.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

In the 3GPP standards, the direct communication link between devices and devices is referred as sidelink, and similar to the uplink and downlink, there are also control channels and shared channels on the sidelink, of which the former is referred as a physical sidelink control channel (PSCCH), the latter as a physical sidelink shared channel (PSSCH). The PSCCH is utilized to indicate the time-frequency domain resource position transmitted by the PSSCH, the modulation and coding modes, the reception target ID for which the PSSCH is directed, and other information, and the PSSCH is used to carry data.

At present, two types of sidelink communication mechanisms are defined in the 3GPP standards, namely, Device to Device (D2D) and V2X (Vehicle to Vehicle/Pedestrian/Infrastructure/Network, hereinafter referred to as V2X), of which the latter is superior to the former in terms of data rate, delay and reliability, so it has become the most representative sidelink communication technology in the current 3GPP standards. With regard to the resource assignment mechanism, the existing V2X technology includes two modes, namely, a resource assignment mode based on base station scheduling (Mode 3) and a resource assignment mode selected by UE (Mode 4). For Mode 3, the UE determines the transmission resource on the sidelink channel assigned by the base station through receiving the downlink control channel of the base station, and the mutual interference between the transmission resources of different UEs may be minimized by a reasonable base station scheduling policy. For Mode 4, the base station does not participate in specific resource assignment, and the UE determines the best transmission resource by detecting the channel. Since the existing V2X technology is mainly used to support broadcast services at the beginning of the design, Mode 3 and Mode 4 currently use the broadcast transmission mode at the physical layer, that is, the physical channel transmitted by any one UE may be received and demodulated by other UEs within a certain range. Therefore, in the sidelink communication, the receiving end is not required to feed back the information about the hybrid automatic repeat request acknowledge (HARQ-ACK) and the channel state information to the transmitting end. This implementation is beneficial to reduce complexity of the entire system, but the spectral efficiency on the sidelink channel is therefore seriously affected.

Due to the increasing demand for V2X technology in the market, the 3GPP will continue to evolve V2X technology to support more types of services expected by the market. Since the above new service types often require high data transmission rates, and some new service types may be effectively supported by physical layer unicast, in this case, there is currently no ideal technical solution to implement feedback of the above information in the sidelink communication.

SUMMARY

A method of for processing information is provided. The method comprises determining a corresponding feedback resource based on received indication information; receiving sidelink data transmitted by a second UE; and, transmitting feedback information of the sidelink data on the sidelink data. In the present application, the problem of implementing feedback of HARQ-ACK information and channel state information in the sidelink communication is addressed, and the mode of transmitting the sidelink data is further optimized, thereby improving spectral efficiency on the sidelink channel.

BRIEF DESCRIPTION OF THE DRAWINGS

The above and/or additional aspects and advantages of the present application will become apparent and readily understood by describing in detail embodiments thereof with reference to the accompanying drawings, in which:

FIG. 1 is a flowchart of a method for processing information in a first UE side according to an embodiment of the present application;

FIG. 2 is a brief schematic diagram of processing information in the first UE side according to an embodiment of the present application;

FIG. 3 is a brief schematic diagram of processing information in a second UE side according to an embodiment of the present application;

FIG. 4 is a schematic diagram of a first processing flow of the method for processing information in the first UE side according to an embodiment of the present application;

FIG. 5 is a schematic diagram of a method for processing information according to Embodiment I of the present application;

FIG. 6 is a schematic diagram of a method for jointly counting DAIs of a sidelink channel and a downlink channel transmission according to Embodiment I of the present application;

FIG. 7 is a schematic diagram of a second processing flow of a method for processing information in the first UE side according to Embodiment I of the present application;

FIG. 8 is a schematic diagram of a method for processing information according to Embodiment II of the present application;

FIG. 9 is a schematic diagram of a method for processing information according to Embodiment III of the present application;

FIG. 10 is a schematic diagram of a method for processing information according to Embodiment IV of the present application;

FIG. 11 is a schematic structural diagram of a terminal device in the first UE side according to an embodiment of the present application;

FIG. 12 is a flowchart of a method for processing information in the second UE side according to an embodiment of the present application; and, FIG. 13 is a schematic structural diagram of a terminal device in the second UE side according to an embodiment of the present application.

FIG. 14 schematically illustrates a terminal device in the first UE side according to an embodiment of the present disclosure.

FIG. 15 schematically illustrates a terminal device in the second UE side according to an embodiment of the present disclosure.

FIG. 16 schematically illustrates a base station according to an embodiment of the present disclosure.

DETAILED DESCRIPTION

The purpose of the present application is to address at least one of the above technical drawbacks, in particular to address the problem of implementing feedback of HARQ-ACK information and channel state information in the sidelink communication.

In the present application, the first aspect provides a method for processing information, including the following steps:

determining a corresponding feedback resource based on received indication information;

receiving sidelink data transmitted by a second UE; and, transmitting feedback information of the sidelink data on the feedback resource.

According to an embodiment of the present disclosure, the step of determining a corresponding feedback resource based on received indication information, comprises: receiving the indication information transmitted by a base station; and, acquiring an uplink channel feedback resource carried in the indication information.

According to an embodiment of the present disclosure, the indication information further carries a time-frequency resource position and a transmission mode of the sidelink data transmitted by the second UE, and the step of receiving sidelink data transmitted by the second UE comprises: receiving the sidelink data transmitted by the second UE based on the time-frequency resource position and the transmission mode in the indication information.

According to an embodiment of the present disclosure, the indication information is carried by a downlink control channel, and the downlink control channel is scrambled by a specific radio network temporary identity RNTI.

According to an embodiment of the present disclosure, the specific radio network temporary identify RNTI comprises one of the following: an RNTI of the second UE, an RNTI of a first UE transmitting the feedback information of the sidelink data, and a function of the RNTI of the second UE and the RNTI of the first UE.

According to an embodiment of the present disclosure, the method further comprises: counting downlink assignment indexes DAIs of the sidelink data and the downlink channel jointly and successively, if an uplink channel feedback resource of information about a hybrid automatic repeat request acknowledge HARQ-ACK for feeding back the sidelink data is consistent with an uplink channel feedback resource of the HARQ-ACK information for feeding back the downlink channel.

According to an embodiment of the present disclosure, if the feedback resource is the uplink channel feedback resource, the indication information further carries time-position information of the uplink channel feedback resource.

According to an embodiment of the present disclosure, the step of determining a corresponding feedback resource based on the received indication information, comprises: receiving a physical sidelink control channel PSCCH transmitted by the second UE and/or a physical sidelink shared channel PSSCH; and, determining a corresponding uplink channel feedback resource and/or a corresponding sidelink channel feedback resource according to the PSCCH and/or the PSSCH.

According to an embodiment of the present disclosure, the step of determining the corresponding uplink channel feedback resource and/or the corresponding sidelink channel feedback resource according to the PSCCH and/or the PSSCH, comprises: determining the uplink channel feedback resource and/or the sidelink channel feedback resource according to the indication information in the PSCCH; and, determining the sidelink channel feedback resource according to the correspondence between the resource where the PSCCH/PSSCH is located and the feedback resource.

According to an embodiment of the present disclosure, the PSCCH further carries a time-frequency resource position and a transmission mode of the sidelink data transmitted by the second UE, and the step of receiving the sidelink data transmitted by the second UE comprises: receiving the sidelink data transmitted by the second UE based on the time-frequency resource position and the transmission mode carried in the PSCCH.

According to an embodiment of the present disclosure, the PSCCH further carries a time-position information of the uplink channel feedback resource, if the feedback resource is the uplink channel feedback resource; and/or, the PSCCH further carries a time-position information of the sidelink channel feedback resource, if the feedback resource is the sidelink channel feedback resource.

According to an embodiment of the present disclosure, the step of transmitting feedback information of the sidelink data on the feedback resource, comprises at least one of the following: transmitting a hybrid automatic repeat request acknowledge HARQ-ACK and channel state information CSI of the sidelink data on the sidelink channel feedback resource, if the feedback resource is the sidelink channel feedback resource; and, transmitting the HARQ-ACK of the sidelink data on the uplink channel feedback resource and transmitting the CSI on the sidelink channel feedback resource, if the feedback resource includes the uplink channel feedback resource and the sidelink channel feedback resource.

According to an embodiment of the present disclosure, if the feedback resource is the uplink channel feedback resource, the step of transmitting the feedback resource of the sidelink data on the feedback resource, comprises: transmitting the hybrid automatic repeat request acknowledge HARQ-ACK and channel state information CSI of the sidelink data on the uplink channel feedback resource.

The second aspect provides a terminal device, including:
a determining unit, configured to determine a corresponding feedback resource based on received indication information;
a receiving unit, configured to receiving sidelink data transmitted by a second UE; and,
a transmitting unit, configured to transmit feedback information of the sidelink data on the feedback resource.

The third aspect provides a terminal device, including a memory and a first processor, the memory is configured to store a computer program, and when the computer program is executed by the first processor, the steps of the foregoing method for processing information are implemented.

The fourth aspect provides a method for processing information, including the following steps:
receiving status indication information transmitted by a first UE;
determining a connection relationship between the first UE and a base station based on the status indication information; and,
determining whether to receive feedback information transmitted by the first UE on a feedback resource, based on the connection relationship between the first UE and the base station.

According to an embodiment of the present disclosure, the step of determining whether to receive feedback information transmitted by the first UE on the feedback resource, according to the connection relationship between the first UE and the base station, comprises: receiving feedback information transmitted by the first UE on the feedback resource, if there is no RRC connection between the first UE and the base station; specifically, receiving indication information transmitted by the base station and transmitting the indication information to the first UE, such that the first UE determines a time-frequency resource position, a transmission mode, and a feedback resource of the corresponding sidelink data based on the received indication information; and, receiving feedback information transmitted by the first UE on the feedback resource.

According to an embodiment of the present disclosure, the step of determining whether to receive feedback information transmitted by the first UE on the feedback resource, according to the connection relationship between the first UE and the base station, comprises: receiving the indication information transmitted by the base station, and transmitting the sidelink data according to the indication information, if there is RRC connection between the first UE and the base station.

The fifth aspect provides a terminal device, including:
a receiving unit, configured to receive status indication information transmitted by a first UE;
a first processing unit, configured to determine a connection relationship between the first UE and a base station based on the status indication information; and,
a second processing unit, configured to determine whether to receive feedback information transmitted by the first UE on a feedback resource, according to the connection relationship between the first UE and the base station.

The sixth aspect provides a terminal device, including a memory and a first processor, the memory is configured to store a computer program, and when the computer program is executed by the first processor, the steps of the foregoing method for processing information are implemented.

In the present application, the corresponding feedback resource is determined based on the received indication information; and the sidelink data transmitted by the second UE is received; and the feedback information of the sidelink data is transmitted on the feedback resource, thereby, the problem of implementing feedback of HARQ-ACK information and channel state information in the sidelink communication is addressed, and the mode of transmitting the sidelink data is further optimized, therefore improving spectral efficiency on the sidelink channel.

Additional aspects and advantages of the present application will partly be presented in the following description, partly become apparent in the following description or be appreciated in practicing of the present application.

The embodiments of the present application will be described in detail hereafter, and examples of the embodiments are illustrated in the accompanying drawings, throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/comprise" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Those skilled in the art will appreciate that all terms (including technical terms and scientific terms) used herein have the same meaning as commonly understood by one of ordinary skill in the art to belonging to the field of the present application, unless otherwise defined. It should also be understood that those terms, such as those defined in a general dictionary, should be considered to have a meaning consistent with the meaning in the context of the prior art, and, unless clearly defined herein, should not be understood differently or as having an excessively formal meaning.

Those skilled in the art may understand that the "terminal" and "terminal device" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices having a conventional laptop and/or palmtop computer or other devices and/or having a radio frequency receiver. As used herein, "terminal" and "terminal device" may be portable, transportable, installed in a vehicle (in aviation, sea and/or land), or adapted and/or configured to operate locally, and/or operated in any other location on the earth and/or space in a distributed form. As used herein, "terminal" and "terminal device" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

Hereafter, a UE receiving control and shared channels from other UEs and performing information feedback, is defined as a first UE, and a UE transmitting control and shared channels is defined as a second UE, unless otherwise specified.

The present application provides a method for processing information, as shown in FIG. 1, including the following steps:

Step 101: determining a corresponding feedback resource based on received indication information;

Step 102: receiving sidelink data transmitted by a second UE;

Step 103: transmitting feedback information of the sidelink data on the feedback resource.

Based on the above method, the problem of implementing feedback of HARQ-ACK information and channel state information in the sidelink communication is addressed, and the mode of transmitting sidelink data is further optimized, thereby improving spectral efficiency on the sidelink channel.

In order to improve spectral efficiency of the V2X communication system and thus support the high data rate service type more effectively, it is necessary to introduce certain information feedback in the sidelink communication, and in this regard, the present application proposes a method for processing information in the sidelink communication, as shown in FIG. 2, including the following steps for the first UE:

Step 201: determining, by the first UE, a resource for information feedback (hereinafter referred to as a feedback resource).

In the present application, the first UE may determine the feedback resource according to the received base station scheduling signaling, and may also determine the feedback resource according to the received PSCCH or PSSCH transmitted by the second UE. In the present application, the feedback resource may be a physical uplink control channel (PUCCH) resource on the uplink channel or a physical uplink shared channel (PUSCH) resource on the uplink channel, or a PSCCH or a PSSCH resource on the sidelink channel, or a newly defined sidelink channel resource.

Step 202: receiving, by the first UE, the sidelink data transmitted by the second UE.

The first UE may determine, according to the received scheduling signaling from the base station, a time-frequency position and a mode for transmitting the sidelink data by the second UE; or, the first UE may determine a time-frequency position and a mode for transmitting the sidelink data by receiving the PSCCH transmitted by the second UE.

Step 203: feeding back, by the first UE, corresponding information in a corresponding manner on the determined resource.

If the feedback resource is a resource on the uplink channel, the first UE feeds back the corresponding information by using the PUCCH or the PUSCH; if the feedback resource is a resource on the sidelink channel, the first UE feeds back the corresponding information by using the PUCCH, the PUSCH, or the newly defined sidelink channel. The information may be the HARQ-ACK information, and the first UE determines the HARQ-ACK information of the feedback according to the received data from the second UE. The information may also be channel state information or a second UE buffer status report (BSR).

As shown in FIG. 3, for the second UE, the following steps are included:

Step 301: searching, by the second UE, for a specific radio network temporary identity (RNTI) in a search space of a specific downlink control channel to scramble the downlink control channel.

In the present application, the downlink control channel should include at least one of the following information: information for indicating a PSSCH transmission resource of the second UE, and information for indicating a PSSCH transmission mode of the second UE, information for indicating one or more feedback resources of the first UE, and the like.

Step 302: transmitting, by the second UE, the PSSCH and/or the PSCCH according to the detected downlink control channel.

Wherein, the corresponding information is indicated in the PSCCH when transmitting the PSCCH; the corresponding information indicated in the PSCCH should be consistent with the information contained in the downlink control channel detected by the second UE.

Based on the above method for processing information, the method will be explained in detail below, as shown in FIG. 4, that is a schematic diagram of the first specific processing flow of the method for processing information provided by the embodiment of the present application, including the following steps:

Step 401: receiving, by the first UE, an uplink channel feedback resource transmitted by the base station.

In this step, the above processing is specifically:

receiving indication information transmitted by the base station;

acquiring the uplink channel feedback resource carried in the indication information.

Step 402: receiving, by the first UE, the sidelink data transmitted by the second UE.

In this step, the above processing is:

the indication information further carries a time-frequency resource position and a transmission mode of the sidelink data transmitted by the second UE, and the step of receiving the sidelink data transmitted by the second UE, includes:

receiving the sidelink data transmitted by the second UE, based on the time-frequency resource position and the transmission mode in the indication information.

Wherein, the indication information is carried by the downlink control channel, and the downlink control channel is scrambled by a specific radio network temporary identity RNTI.

Further, the specific radio network temporary identify RNTI includes one of the following: an RNTI of the second UE, an RNTI of the first UE transmitting the feedback information of the sidelink data, and a function of the RNTI of the second UE and the RNTI of the first UE.

Step 403: transmitting, by the first UE, the feedback information of the sidelink data on the feedback resource.

In the technical solution, the method further includes:

counting downlink assignment indexes DAIs of the sidelink data and the downlink channel jointly and successively, if the uplink channel feedback resource of the HARQ-ACK information for feeding back the sidelink data is consistent with the uplink channel feedback resource of the HARQ-ACK information for feeding back the downlink channel.

Further, if the feedback resource is the uplink channel feedback resource, the indication information further carries time-position information of the uplink channel feedback resource.

Based on the technical solution provided by the foregoing embodiment of the present application, the technical solution will be described in detail below with reference to one specific embodiment.

Embodiment I

A schematic diagram of this embodiment is shown in FIG. 5. In the embodiment, the second UE detects the downlink control channel C10 transmitted by the base station in a specific downlink control channel search space S10, determines the time-frequency resource for transmitting the PSSCH, and the transmission mode of the PSSCH, which the transmission mode of the PSSCH includes the modulation and coding mode of the PSSCH, transmission power control, etc. The C10 is scrambled by a specific RNTI10, which may be configured by the base station, and in this case, preferably, the value of RNTI10 should be different from the value of other RNTIs of the second UE. The value of RNTI10 may also be a function of the specific RNTI and RNT11 of the first UE and the specific RNTI and RNTI12 of the second UE, for example, the RNTI10 may be obtained by performing the "AND" operation, the "OR" operation, or the "XOR" operation on the RNTI11 and the RNTI12 in bits, and in this case, the second UE determines the value of the RNTI11 by receiving signaling of the base station or information transmitted by the first UE.

In addition, the first UE detects C10 in S10 and acquires the configuration of the feedback resource therefrom, and preferably, the first UE may further acquire, by using C10, a time-frequency position and a mode for transmitting the sidelink data by the second UE. The first UE may determine the configuration of S10 and the value of RNTI10 by receiving signaling of the base station or by receiving information transmitted by the second UE. Consequently, in this embodiment, the downlink control channel C10 should include at least the information indicating the PSSCH transmission resource of the second UE, the information indicating the PSSCH transmission mode of the second UE, and the information indicating the feedback resource of the first UE.

The above feedback resource may be an uplink control channel PUCCH resource, and in this case, the first UE may determine the PUCCH resource according to the PUCCH resource index in C10 and/or the index of the control channel element (CCE) of C10, which the PUCCH resource is only a PUCCH resource included in one PUCCH resource set. The feedback resource may also be a resource on the uplink shared channel PUSCH, and in this case, the PUSCH resource refers to a specific physical resource block (PRB) in a certain time slot. Regardless of whether the feedback resource is a PUCCH resource or a PUSCH resource, the time-position where the feedback resource is located should be indicated in C10, and the time-position where the feedback resource is located may be represented as an interval from the time-position of C10 or an interval from the time-position of the received PSSCH.

The first UE should further receive the PSSCH transmitted by the second UE according to the indication of C10, and the first UE should feed back the HARQ-ACK information on the feedback resource according to the detection result of the PSSCH, that is, if the PSSCH is successfully demodulated, the first UE should feed back a positive acknowledge ACK, otherwise, the first UE should feed back a negative acknowledge NACK.

Preferably, the first UE may simultaneously feed back the HARQ-ACK information of the PSSCH and the HARQ-ACK information of the downlink channel received by the first UE in the same PUCCH, wherein the downlink channel includes the PDSCH20 that needs to feed back the HARQ-ACK information and the PDCCH20 that indicates release of semi-persistent scheduling (SPS). In this case, C10 should include a downlink assignment index (DAI). When the HARQ-ACK feedback information of the PSSCH and the HARQ-ACK feedback information of the PDSCH20 or PDCCH20 are fed back in the same feedback resource, the DAI included in C10 should be uniformly counted with the DAI included in PDCCH of the scheduled PDSCH20 as well as the DAI in PDCCH20 as shown in FIG. 6.

Preferably, in this embodiment, the second UE may further carry the buffer status report (BSR) of the sidelink data of the UE by using the transmitted PSSCH, and after successfully demodulating the PSSCH transmitted by the second UE, the first UE may feed back the BSR transmitted by the second UE to the base station. It should be noted that the feedback resource used by the first UE to feed back the BSR may be consistent with the feedback resource used to feed back the HARQ-ACK information, or may be different with thereof.

With the method of the embodiment, the first UE may directly feed the information back to the base station in a fast manner, and the base station may perform scheduling on the second UE according to the received information. Since the information is fed back via the uplink channel, there is no need to introduce an information feedback mechanism on the sidelink channel, which is advantageous for simplifying the implementation of the sidelink channel.

Based on the above method for processing information, the method will be explained in detail below. As shown in FIG. 7, the second specific processing flow diagram of the method for processing information provided by the embodiment of the present application includes the following steps:

Step 701: receiving, by the first UE, the PSCCH and/or the PSSCH transmitted by the second UE.

Step 702: determining, by the first UE, a corresponding uplink channel feedback resource and/or a sidelink channel feedback resource according to the PSCCH and/or the PSSCH.

In this step, according to the PSCCH/PSSCH, the step of determining the corresponding uplink channel feedback resource and/or the corresponding sidelink channel feedback resource includes one of the following:

determining the uplink channel feedback resource and/or the sidelink channel feedback resource according to the indication information in the PSCCH; and, determining the sidelink channel feedback resource according to the correspondence between the resource wherein the PSCCH/PSSCH is located and the feedback resource.

Step 703: receiving, by the first UE, the sidelink data transmitted by the second UE.

The PSCCH further carries a time-frequency resource position and a transmission mode of the sidelink data transmitted by the second UE, and the step of receiving the sidelink data transmitted by the second UE includes:

receiving the sidelink data transmitted by the second UE based on the time-frequency resource position and the transmission mode carried in the PSCCH.

For the above feedback resource, the PSCCH further carries time-position information of the uplink channel feedback resource if the feedback resource is the uplink channel feedback resource; and/or, the PSCCH further carries time-position information of the sidelink channel feedback resource if the feedback resource is the sidelink channel feedback resource.

Step 704: transmitting, by the first UE, the feedback information of the sidelink data on the feedback resource.

In this step, the mode of transmitting the feedback information includes at least one of the following:

transmitting the hybrid automatic repeat request acknowledge HARQ-ACK and channel state information CSI of the sidelink data on the sidelink channel feedback resource, if the feedback resource is the sidelink channel feedback resource; and, transmitting the HARQ-ACK of the sidelink data on the uplink channel feedback resource and transmitting the CSI on the sidelink channel feedback resource, if the feedback resource includes the uplink channel feedback resource and the sidelink channel feedback resource.

In another processing manner, if the feedback resource is the uplink channel feedback resource, the step of transmitting the feedback resource of the sidelink data on the feedback resource, includes:

transmitting the hybrid automatic repeat request acknowledge HARQ-ACK and channel state information CSI of the sidelink data on the uplink channel feedback resource.

In summary, based on the difference of the feedback resources, when the feedback information of the sidelink data is transmitted on the feedback resource, there are different processing manners, namely:

1. transmitting the HARQ-ACK and the CSI of the sidelink data on the uplink channel feedback resource;

2. transmitting the HARQ-ACK and the CSI of the sidelink data on the sidelink channel feedback resource; and, 3. transmitting the HARQ-ACK of the sidelink data on the uplink channel feedback resource, and transmitting the CSI on the sidelink channel feedback resource.

Based on the technical solution provided by the foregoing embodiment of the present application, the technical solution will be described in detail in the following three specific embodiments. Wherein, the selection of each technical solution is a solution for the different feedback resources mentioned above.

Embodiment II

A schematic diagram of this embodiment is shown in FIG. 8. In the embodiment, the second UE detects the downlink control channel C20 transmitted by the base station in the specific downlink control channel search space S20, and determines the time-frequency resource for transmitting the PSCCH, the time-frequency resource for transmitting the PSSCH, and the transmission mode of the PSSCH, which the transmission mode of the PSSCH includes the modulation and coding mode of the PSSCH, transmission power control, etc. The C20 is scrambled by a specific RNTI20, which may be configured by the base station, and in this case, preferably, the value of RNTI20 should be different from the value of other RNTIs of the second UE. The second UE should further acquire the configuration of the feedback resource from C20. Consequently, in this embodiment, the downlink control channel C20 should include at least the information indicating the PSCCH transmission resource of the second UE, the information indicating the PSSCH transmission resource of the second UE, the information indicating the PSSCH transmission mode of the second UE, and the information indicating the feedback resource of the first UE.

The second UE transmits the PSCCH20 according to the indication of the C20, and indicates the time-frequency resource of the scheduled PSSCH, the transmission mode of the scheduled PSSCH, and the feedback resource in the PSCCH20.

The first UE detects PSCCH20 transmitted by the second UE, receives the scheduled PSSCH according to the indication of the PSCCH20, and acquires the configuration of the feedback resource. The first UE should feed back the HARQ-ACK information on the feedback resource according to the detection result of the PSSCH, that is, if the PSSCH is successfully demodulated, the first UE should feed back a positive acknowledge ACK, otherwise, the first UE should feed back a negative acknowledge NACK.

The above feedback resource may be the uplink control channel PUCCH resource, and in this case, the second UE may determine the PUCCH resource according to the PUCCH resource index in C20 and/or the index of the control channel element (CCE) of C20, which the PUCCH resource is only a PUCCH resource included in one PUCCH resource set. The second UE indicates the above PUCCH resource by using a CEIL (log 2U) bit in the transmitted PSCCH, wherein CEIL(•) indicates an upward rounding operation, and U indicates a maximum number of PUCCH resources that may be configured in the PUCCH set of the first UE, and the second UE may be configured by the base station to interact with the information of the first UE, or pre-configured to determine the value of U. The feedback resource may also be a resource on the uplink shared channel PUSCH, and in this case, the PUSCH resource refers to a specific physical resource block (PRB) in a certain time slot. Regardless of whether the feedback resource is a PUCCH resource or a PUSCH resource, the time-position where the feedback resource is located should be indicated in the C20, and the time-position where the feedback resource is located may be represented as an interval from the time-position of PSCCH transmitted by the second UE, or an interval from the time-position of the received PSSCH.

Preferably, the first UE may simultaneously feed back the HARQ-ACK information of the PSSCH and the HARQ-ACK information of the downlink channel received by the first UE in the same PUCCH, wherein the downlink channel includes the PDSCH20 that need to feed back the HARQ-ACK information and the PDCCH20 that indicates release of semi-persistent scheduling (SPS). In this case, the C30 and the PSCCH20 should include a downlink assignment index (DAI). When the HARQ-ACK feedback information of the PSSCH and the HARQ-ACK feedback information of the PDSCH20 or the PDCCH20 are in the same feedback resource feedback, the DAI included in the C30 and the PSCCH20 should be uniformly counted with the DAI included in the PDCCH of the scheduled PDSCH20 as well as the DAI in the PDCCH20, as shown in FIG. 6.

Further, in this embodiment, the second UE may further carry the buffer status report (BSR) of the sidelink data of the UE by using the transmitted PSSCH, and after successfully demodulating the PSSCH transmitted by the second UE, the first UE may feed back the BSR transmitted by the second UE to the base station. It should be noted that the feedback resource used by the first UE to feed back the BSR may be consistent with the feedback resource used to feed back the HARQ-ACK information, or may be different with thereof.

With the method of the embodiment, the first UE acquires the configuration of the feedback resource by using the PSCCH transmitted by the second UE, and there is no need to detect the downlink control channel C20, which is beneficial to reducing the detection complexity of the first UE.

Embodiment III

A schematic diagram of this embodiment is shown in FIG. 9. In the embodiment, the second UE detects the downlink control channel C30 transmitted by the base station in the specific downlink control channel search space S30, and determines the time-frequency resource for transmitting the PSCCH, the time-frequency resource for transmitting the PSSCH, and transmission power control for transmitting the PSSCH, etc. The C30 is scrambled by a specific RNTI30, and the RNTI30 may be configured by the base station, and in this case, preferably, the value of RNTI30 should be different from the value of other RNTIs of the second UE. The second UE should further acquire the configuration of the first feedback resource of the first UE from the C30, and the second UE may also acquire the configuration of the second feedback resource from the C30. Consequently, in this embodiment, the downlink control channel C30 should include at least the information indicating the PSCCH transmission resource of the second UE, the information indicating the PSSCH transmission resource of the second UE, the information indicating the PSSCH transmission mode of the second UE, and information indicating the first feedback resource of the first UE, as well as the information indicating the second feedback resource of the first UE.

The first feedback resource may be the uplink control channel PUCCH resource, and in this case, the second UE may determine the PUCCH resource according to the PUCCH resource index in C30 and/or the index of the control channel element (CCE) of C30, which the PUCCH resource is only a PUCCH resource included in one PUCCH resource set. The second UE indicates the above PUCCH resource by using a CEIL (log 2U) bit in the transmitted PSCCH, wherein CEIL(•) indicates an upward rounding operation, and U indicates a maximum number of PUCCH resources that may be configured in the PUCCH set of the first UE, and the second UE may be configured by the base station to interact with the information of the first UE, or pre-configured to determine the value of U. The first feedback resource may also be a resource on the uplink shared channel PUSCH, and in this case, the PUSCH resource refers to a specific physical resource block (PRB) in a certain time slot. Regardless of whether the first feedback resource is a PUCCH resource or a PUSCH resource, the time-position of the feedback resource should be indicated in C30, that is, the interval between the time-position of receiving the PSSCH and the time-position of the feedback resource. The first feedback resource is used by the first UE to feed back HARQ-ACK information of the PSSCH.

In addition, the second feedback resource is a resource on the sidelink channel, for example, the second feedback resource may be one PSCCH resource on the sidelink channel, or may be a specific resource on the sidelink channel for transmitting the PSSCH. The second feedback resource is used by the first UE to feed back CSI (Channel State Information).

The second UE transmits the PSCCH30 according to the indication of C30, and indicates the time-frequency resource of the scheduled PSSCH, the transmission power of the scheduled PSSCH, and the first feedback resource in the PSCCH30.

The first UE detects the PSCCH30 transmitted by the second UE, receives the scheduled PSSCH according to the indication of the PSCCH30, and acquires the configuration of the first feedback resource and the second feedback resource. The first UE should feed back the HARQ-ACK information on the first feedback resource according to the detection result of the PSSCH, that is, if the PSSCH is successfully demodulated, the first UE should feed back a positive acknowledge ACK, otherwise, the first UE should feed back a negative acknowledge NACK. The first UE should measure the CSI on the sidelink channel with the second UE and feed back to the second UE through the second feedback resource.

Further, the first UE may simultaneously feed back the HARQ-ACK information of the PSSCH and the HARQ-ACK information of the downlink channel received by the first UE in the same PUCCH, wherein the downlink channel includes the PDSCH30 that needs to feed back the HARQ-ACK information and the PDCCH30 that indicates release of semi-persistent scheduling (SPS). In this case, the C30 and the PSCCH30 should include a downlink assignment index (DAI). When the HARQ-ACK feedback information of the PSSCH and the HARQ-ACK feedback information of the PDSCH30 or the PDCCH30 are fed back in the same feedback resource, the DAI included in the C30 and the PSCCH30 should be uniformly counted with the DAI included in the PDCCH of the scheduled PDSCH30 as well as the DAI in the PDCCH30, as shown in FIG. 6.

Further, in this embodiment, the second UE may further carry the buffer status report (BSR) of the sidelink data of the UE by using the transmitted PSSCH, and after successfully demodulating the PSSCH transmitted by the second UE, the first UE may feed back the BSR transmitted by the second UE to the base station. It should be noted that the feedback resource used by the first UE to feed back the BSR may be consistent with the feedback resource used to feed back the HARQ-ACK information, or may be different with thereof.

With the method of this embodiment, the second UE may acquire the CSI information on the sidelink channel, thereby having the capability to more accurately select the transmission mode of the PSSCH.

Embodiment IV

A schematic diagram of this embodiment is shown in FIG. 10. In the embodiment, the second UE detects the downlink control channel C40 transmitted by the base station in the specific downlink control channel search space S40, and determines the time-frequency resource for transmitting the PSCCH, the time-frequency resource for transmitting the PSSCH, and transmission power control for transmitting the PSSCH, etc. The C40 is scrambled by a specific RNTI40, and the RNTI40 may be configured by the base station, and in this case, preferably, the value of RNTI40 should be different from the value of other RNTIs of the second UE. The second UE should further acquire the configuration of the feedback resource of the first UE from the C40. Consequently, in this embodiment, the downlink control channel C40 should include at least the information indicating the PSCCH transmission resource of the second UE, the information indicating the PSSCH transmission resource of the second UE, information indicating the PSSCH transmission mode of the second UE, and information indicating the feedback resource of the first UE.

The feedback resource of the first UE is a resource on the sidelink channel, for example, the feedback resource may be one PSCCH resource on the sidelink channel, or may be a specific resource on the sidelink channel for transmitting the PSSCH.

The second UE transmits the PSCCH40 according to the indication of the C40, and indicates the time-frequency resource of the scheduled PSSCH, the transmission power of the scheduled PSSCH, and the feedback resource of the first UE in the PSCCH40.

The first UE detects the PSCCH40 transmitted by the second UE, receives the scheduled PSSCH according to the indication of the PSCCH40, and acquires the configuration of the feedback resource. The first UE should feed back the HARQ-ACK information on the feedback resource according to the detection result of the PSSCH, that is, if the PSSCH is successfully demodulated, the first UE should feed back a positive acknowledge ACK, otherwise, the first UE should feed back a negative acknowledge NACK. The first UE should measure the CSI on the sidelink channel with the second UE and feed back to the second UE through the feedback resource.

With the method of the present embodiment, there is no need to maintain an RRC (Radio Resource Control) connection between the first UE and the base station, and the information feedback in the case where the first UE is in the coverage of the base station can be supported.

Embodiment V

In this embodiment, the second UE determines the status of the first UE by acquiring the information transmitted by the first UE, wherein the status includes whether the first UE is in the coverage of the base station, and whether there is an RRC connection between the first UE and the base station if the first UE is in the coverage of the base station. In addition, the first UE or the second UE should report the radio network identity of the first UE to the base station by using corresponding signaling information. If the first UE is in the coverage of the base station, and there is the RRC connection between the first UE and the base station, then the second UE should detect the downlink control channel by using the method shown in Embodiment I of the present application, and transmit the PSSCH according to the detected downlink control. The first UE should also detect the downlink control channel and the PSSCH transmitted by the second UE by using the method in Embodiment I, and feed the HARQ-ACK information and/or the CSI information back to the base station. If there is no RRC connection between the first UE and the base station, the second UE should detect the downlink control channel by using the method in Embodiment IV of the present application, and transmit the PSCCH and the PSSCH according to the detected downlink control channel. The first UE should also detect the PSCCH and the PSSCH transmitted by the second UE by using the method in Embodiment IV, and feed the HARQ-ACK information and/or the CSI information back to the second UE.

Based on the foregoing methods provided by the embodiments of the present application, the embodiment of the present application further provides a terminal device, as shown in FIG. 11, includes:

a determining unit 1101, configured to determine, according to the received indication information, a corresponding feedback resource;

a receiving unit 1102, configured to receive sidelink data transmitted by a second UE; and, a transmitting unit 1103, configured to transmit feedback information of the sidelink data on the feedback resource.

The determining unit 1101 is specifically configured to receive the indication information transmitted by the base station, and acquire the uplink channel feedback resource carried in the indication information.

The indication information further includes a time-frequency resource position and a transmission mode of the sidelink data transmitted by the second UE, and the receiving unit 1102 is specifically configured to receive the sidelink data transmitted by the second UE based on the time-frequency resource position and the transmission mode in the indication information Wherein, the indication information is carried by the downlink control channel, and the downlink control channel is scrambled by the specific radio network temporary identity RNTI.

Further, the specific radio network temporary identify RNTI includes one of the following: an RNTI of the second UE, an RNTI of a first UE transmitting the feedback information of the sidelink data, and a function of the RNTI of the second UE and the RNTI of the first UE.

The device further includes:

The sidelink data and the downlink assignment indexes DAIs of the downlink channel are counted jointly and successively, if the uplink channel feedback resource of the HARQ-ACK information for feeding back the sidelink data is consistent with the uplink channel feedback resource of HARQ-ACK information for feeding back the downlink channel.

If the feedback resource is an uplink channel feedback resource, the indication information further carries time-position information of the uplink channel feedback resource.

The determining unit 1101 is further configured to receive the PSCCH and/or the PSSCH transmitted by the second UE, and determine a corresponding uplink channel feedback resource and/or a sidelink channel feedback resource according to the PSCCH and/or the PSSCH.

Wherein, the determining unit 1101 determines the corresponding uplink channel feedback resource and/or the corresponding sidelink channel feedback resource according to the PSCCH/PSSCH, including one of the following:

determining the uplink channel feedback resource and/or the sidelink channel feedback resource according to the indication information of the PSCCH; and, determining the sidelink channel feedback resource according to the correspondence between the resource where the PSCCH/PSSCH is located and the feedback resource.

Further, the PSCCH further carries the time-frequency resource position and the transmission mode of transmitting the sidelink data by the second UE, and the receiving unit 1102 is further specifically configured to receive, based on the time-frequency resource position and the transmission mode carried in the PSCCH, the sidelink data transmitted by second UE.

Further, the PSCCH further carries the time-position information of the uplink channel feedback resource if the feedback resource is the uplink channel feedback resource; and/or, the PSCCH further carries time-position information of the sidelink channel feedback resource if the feedback resource is the sidelink channel feedback resource.

The transmitting unit 1103 transmits the feedback information of the sidelink data on the feedback resource, including at least one of the following:

transmitting the hybrid automatic repeat request acknowledge HARQ-ACK and the channel state information CSI of the sidelink data on the sidelink channel feedback resource, if the feedback resource is the sidelink channel feedback resource; and, transmitting the HARQ-ACK of the sidelink data on the uplink channel feedback resource and transmitting the CSI on the sidelink channel feedback resource, if the feedback resource includes the uplink channel feedback resource and the sidelink channel feedback resource.

The transmitting unit 1103 is further configured to transmit the hybrid automatic repeat request acknowledge HARQ-ACK and channel state information CSI of the sidelink data on the uplink channel feedback resource, if the feedback resource is the uplink channel feedback resource.

The terminal device illustrated in FIG. 11 may correspond to the terminal device 1400 illustrated in FIG. 14. For example, the processor 1401 of the terminal device 1400 may comprise the determining unit 1101 of the terminal device illustrated in FIG. 11, or perform the operations performed by the determining unit 1101 described herein, respectively.

The embodiment of the present application further provides a method for processing information, as shown in FIG. 12, including the following steps:

Step 1201: receiving status indication information transmitted by a first UE; Step 1202: determining a connection relationship between the first UE and a base station based on the status indication information; and, Step 1203: determining whether to receive feedback information transmitted by the first UE on a feedback resource, according to the connection relationship between the first UE and the base station.

The step of determining whether to receive feedback information transmitted by the first UE on the feedback resource, based on the connection relationship between the first UE and the base station, includes:

receiving feedback information transmitted by the first UE on the feedback resource if there is no RRC connection between the first UE and the base station;

specifically, receiving indication information transmitted by the base station and transmitting the indication information to the first UE, such that the first UE determines a time-frequency resource position, a transmission mode, and a feedback resource of the corresponding sidelink data based on the received indication information; and, receiving feedback information transmitted by the first UE on the feedback resource.

The method further includes receiving the indication information transmitted by the base station, and transmitting the sidelink data based on the indication information, if there is RRC connection between the first UE and the base station.

Based on the above method provided by the embodiment of the present application, the embodiment of the present application further provides a terminal device, as shown in FIG. 13, including:

a receiving unit 1301, configured to receive status indication information transmitted by a first UE;

a first processing unit 1302, configured to determine a connection relationship between the first UE and a base station based on the status indication information; and, a second processing unit 1303, configured to determine whether to receive feedback information transmitted by the first UE on a feedback resource, according to the connection relationship between the first UE and the base station.

The second processing unit 1303 is further configured to receive feedback information transmitted by the first UE on the feedback resource if there is no RRC connection between the first UE and the base station;

Specifically, the second processing unit 1303 is configured to receive indication information transmitted by the base station and transmitting the indication information to the first UE, such that the first UE determines a time-frequency resource position, a transmission mode, and a feedback resource of the corresponding sidelink data based on the received indication information;

The receiving unit 1301 is further configured receive feedback information transmitted by the first UE on the feedback resource.

The receiving unit 1301 is further configured to receive the indication information transmitted by the base station, if there is RRC connection between the first UE and the base station, and the second processing unit 1303 transmits the sidelink data according to the indication information.

The embodiment of the present application further provides a terminal device, including a memory and a first processor, wherein the memory is configured to store a computer program, when the computer program is executed by the first processor, the steps of the foregoing method for processing information are implemented.

The terminal device illustrated in FIG. 13 may correspond to the terminal device 1500 illustrated in FIG. 15. For example, the processor 1501 of the terminal device 1500 may comprise the first processing unit 1302 and the second processing unit 1303 of the terminal device of the terminal device illustrated in FIG. 13, or perform the operations performed by the first processing unit 1302 and the second processing unit 1303 described herein, respectively.

FIG. 14 schematically illustrates a terminal device in the first UE side according to an embodiment of the present disclosure.

The terminal devices in the first UE side or the first UEs described above may correspond to the terminal device 1400 in the first UE side. For example, the terminal device illustrated in FIG. 11 may correspond to the terminal device 1400.

Referring to the FIG. 14, the terminal device 1400 may include a processor 1401, a transceiver 1402 and a memory 1403. However, all of the illustrated components are not essential. The terminal device 1400 may be implemented by more or less components than those illustrated in FIG. 14. In addition, the processor 1401 and the transceiver 1402 and the memory 1403 may be implemented as a single chip according to another embodiment.

The aforementioned components will now be described in detail.

The processor 1401 may include one or more processors or other processing devices that control the proposed function, process, and/or method. Operation of the terminal device 1400 may be implemented by the processor 1401.

The processor 1401 may detect a PDCCH on a configured control resource set. The processor 1401 determines a method for dividing CBs and a method for rate matching of a PDSCH according to the PDCCH. The processor 1401 may control the transceiver 1402 to receive the PDSCH according to the PDCCH. The processor 1401 may generate HARQ-ACK information according to the PDSCH. The processor 1401 may control the transceiver 1402 to transmit the HARQ-ACK information.

The transceiver 1402 may include a RF transmitter for up-converting and amplifying a transmitted signal, and a RF receiver for down-converting a frequency of a received signal. However, according to another embodiment, the transceiver 1402 may be implemented by more or less components than those illustrated in components.

The transceiver 1402 may be connected to the processor 1401 and transmit and/or receive a signal. The signal may include control information and data. In addition, the transceiver 1402 may receive the signal through a wireless channel and output the signal to the processor 1401. The transceiver 1402 may transmit a signal output from the processor 1401 through the wireless channel.

The memory 1403 may store the control information or the data included in a signal obtained by the terminal device 1400. The memory 1403 may be connected to the processor 1401 and store at least one instruction or a protocol or a parameter for the proposed function, process, and/or method. The memory 1403 may include read-only memory (ROM) and/or random access memory (RAM) and/or hard disk and/or CD-ROM and/or DVD and/or other storage devices.

FIG. 15 schematically illustrates a terminal device in the second UE side according to an embodiment of the present disclosure.

FIG. 15 schematically illustrates a terminal device 1500 in the second UE side according to an embodiment of the present disclosure.

The terminal devices in the second UE side or the second UEs described above may correspond to the terminal device 1500 in the second UE side. For example, the terminal device illustrated in FIG. 13 may correspond to the terminal device 1500.

Referring to the FIG. 15, the terminal device 1500 may include a processor 1501, a transceiver 1502 and a memory 1503. However, all of the illustrated components are not essential. The terminal device 1500 may be implemented by more or less components than those illustrated in FIG. 15. In addition, the processor 1501 and the transceiver 1502 and the memory 1503 may be implemented as a single chip according to another embodiment.

The aforementioned components will now be described in detail.

The processor 1501 may include one or more processors or other processing devices that control the proposed function, process, and/or method. Operation of the terminal device 1500 may be implemented by the processor 1501.

The processor 1501 may detect a PDCCH on a configured control resource set. The processor 1501 determines a method for dividing CBs and a method for rate matching of a PDSCH according to the PDCCH. The processor 1501 may control the transceiver 1502 to receive the PDSCH according to the PDCCH. The processor 1501 may generate HARQ-ACK information according to the PDSCH. The processor 1501 may control the transceiver 1502 to transmit the HARQ-ACK information.

The transceiver 1502 may include a RF transmitter for up-converting and amplifying a transmitted signal, and a RF receiver for down-converting a frequency of a received signal. However, according to another embodiment, the transceiver 1502 may be implemented by more or less components than those illustrated in components.

The transceiver 1502 may be connected to the processor 1501 and transmit and/or receive a signal. The signal may include control information and data. In addition, the transceiver 1502 may receive the signal through a wireless channel and output the signal to the processor 1501. The transceiver 1502 may transmit a signal output from the processor 1501 through the wireless channel.

The memory 1503 may store the control information or the data included in a signal obtained by the terminal device 1500. The memory 1503 may be connected to the processor 1501 and store at least one instruction or a protocol or a parameter for the proposed function, process, and/or method. The memory 1503 may include read-only memory (ROM) and/or random access memory (RAM) and/or hard disk and/or CD-ROM and/or DVD and/or other storage devices.

FIG. 16 schematically illustrates a base station according to an embodiment of the present disclosure.

The base stations described above may correspond to the base station 1600.

Referring to the FIG. 16, the base station 1600 may include a processor 1601, a transceiver 1602 and a memory 1603. However, all of the illustrated components are not essential. The base station 1600 may be implemented by more or less components than those illustrated in FIG. 16. In addition, the processor 1601 and the transceiver 1602 and the memory 1603 may be implemented as a single chip according to another embodiment.

The aforementioned components will now be described in detail.

The processor 1601 may include one or more processors or other processing devices that control the proposed function, process, and/or method. Operation of the base station 1600 may be implemented by the processor 1601.

The processor 1601 may detect a PUCCH on a configured control resource set. The processor 1601 determines a method for dividing CBs and a method for rate matching of a PUSCH according to the PUCCH. The processor 1601 may control the transceiver 1602 to receive the PUSCH according to the PUCCH. The processor 1601 may generate HARQ-ACK information according to the PUSCH. The processor 1601 may control the transceiver 1602 to transmit the HARQ-ACK information.

The transceiver 1602 may include a RF transmitter for up-converting and amplifying a transmitted signal, and a RF receiver for down-converting a frequency of a received signal. However, according to another embodiment, the transceiver 1602 may be implemented by more or less components than those illustrated in components.

The transceiver 1602 may be connected to the processor 1601 and transmit and/or receive a signal. The signal may include control information and data. In addition, the transceiver 1602 may receive the signal through a wireless channel and output the signal to the processor 1601. The transceiver 1602 may transmit a signal output from the processor 1601 through the wireless channel.

The memory 1603 may store the control information or the data included in a signal obtained by the base station 1600. The memory 1603 may be connected to the processor 1601 and store at least one instruction or a protocol or a parameter for the proposed function, process, and/or method. The memory 1603 may include read-only memory (ROM) and/or random access memory (RAM) and/or hard disk and/or CD-ROM and/or DVD and/or other storage devices.

It should be understood by those skilled in the art that the present application involves devices for carrying out one or more of operations as described in the present application. Those devices may be specially designed and manufactured as intended, or may comprise well known devices in a general-purpose computer. Those devices have computer programs stored therein, which are selectively activated or reconstructed. Such computer programs may be stored in a device (e.g. a computer) readable medium or in any type of medium suitable for storing electronic instructions and respectively coupled to a bus, and the computer readable medium includes but are not limited to any type of disks (including floppy disks, hard disks, optical disks, CD-ROM and magneto optical disks), an ROM (Read-Only Memory), an RAM (Random Access Memory), an EPROM (Erasable Programmable Read-Only Memory), an EEPROM (Electrically Erasable Programmable Read-Only Memory), a flash memory, a magnetic card or an optical line card. In other words, the readable medium comprises any medium storing or transmitting information in a device (e.g., a computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It may be understood by those skilled in the art that the steps, measures and solutions in the operations, methods and flows already discussed in the present application may be alternated, changed, combined or deleted. Further, other steps, measures and solutions in the operations, methods and flows already discussed in the present application may also be alternated, changed, rearranged, decomposed, combined or deleted. Further, the steps, measures and solutions in the art in the operations, methods and operations disclosed in the present application may also be alternated, changed, rearranged, decomposed, combined or deleted.

The foregoing descriptions are merely some implementations of the present application. It should be noted that, to those skilled in the art, various improvements and modifications may be made without departing from the principle of the present application, and these improvements and modifications shall be regarded as falling into the protection scope of the present application.

The invention claimed is:

1. A method performed by a first User Equipment (UE) for processing information, the method comprising:
 receiving information for determining a feedback resource, the information transmitted by a base station;
 receiving control information on a physical sidelink control channel (PSCCH), transmitted by a second UE;
 receiving sidelink data on a physical sidelink shared channel (PSSCH) transmitted by the second UE, based on the control information;
 determining the feedback resource on a sidelink channel based on the received information and the received PSSCH; and
 transmitting feedback information of the sidelink data on the feedback resource.

2. The method of claim 1, wherein the receiving of the sidelink data comprises:
 determining a time-frequency resource for the sidelink data transmitted by the second UE based on the received control information; and
 receiving the sidelink data transmitted by the second UE based on the time-frequency resource.

3. A terminal device, comprising:
 a transceiver; and
 at least one processor coupled with the transceiver and configured to:
  control the transceiver to receive information for determining a feedback resource, the information transmitted by a base station;
  control the transceiver to receive control information on a physical sidelink control channel (PSCCH), transmitted by a second UE
  control the transceiver to receive sidelink data on a physical sidelink shared channel (PSSCH) transmitted by the second UE, based on the control information;
  determine the feedback resource on a sidelink channel based on the received information and the received PSSCH; and
  control the transceiver to transmit feedback information of the sidelink data on the feedback resource.

4. The method of claim 2, wherein the determining the feedback resource on the sidelink channel comprises determining the feedback resource on the sidelink channel according to correspondence between the time-frequency resource for the sidelink data transmitted by the second UE and the feedback resource.

5. The method of claim 1, wherein the receiving of the sidelink data comprises:
   determining a transmission mode for the sidelink data transmitted by the second UE based on the received control information; and
   receiving the sidelink data transmitted by the second UE based on the transmission mode.

6. The method of claim 5, wherein the transmission mode of the sidelink data transmitted by the second UE comprises at least one of a modulation and a coding mode of the sidelink data transmitted by the second UE.

7. The method of claim 1, wherein the transmitting of the feedback information of the sidelink data comprises transmitting a hybrid automatic repeat request acknowledge (HARQ-ACK) of the sidelink data on the feedback resource on the sidelink channel.

8. The terminal device of claim 3, wherein the at least one processor is configured to:
   determine a time-frequency resource for the sidelink data transmitted by the second UE based on the received control information; and
   control the transceiver to receive the sidelink data transmitted by the second UE based on the time-frequency resource.

9. The terminal device of claim 8, wherein the at least one processor is configured to determine the feedback resource on the sidelink channel according to correspondence between the time-frequency resource for the sidelink data transmitted by the second UE and the feedback resource.

10. The terminal device of claim 3, wherein the at least one processor is configured to:
    determine a transmission mode for the sidelink data transmitted by the second UE based on the received control information; and
    control the transceiver to receive the sidelink data transmitted by the UE based on the transmission mode.

11. The terminal device of claim 3, wherein the at least one processor is configured to control the transceiver to transmit a hybrid automatic repeat request acknowledge (HARQ-ACK) of the sidelink data on the feedback resource on the sidelink channel.

\* \* \* \* \*